US009323511B1

(12) United States Patent
Ortega-Binderberger

(10) Patent No.: US 9,323,511 B1
(45) Date of Patent: Apr. 26, 2016

(54) SPLITTING APPLICATION PERMISSIONS ON DEVICES

(71) Applicant: Google Inc., Mountain View, CA (US)

(72) Inventor: Michael Ortega-Binderberger, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/781,164

(22) Filed: Feb. 28, 2013

(51) Int. Cl.
*G06F 9/44* (2006.01)
*G06F 9/445* (2006.01)

(52) U.S. Cl.
CPC .. *G06F 8/60* (2013.01); *G06F 8/65* (2013.01); *G06F 8/67* (2013.01); *G06F 8/61* (2013.01); *G06F 8/68* (2013.01)

(58) Field of Classification Search
CPC ............... G06F 8/60; G06F 8/61; G06F 8/65; G06F 8/67; G06F 8/68
See application file for complete search history.

(56) References Cited

U.S. PATENT DOCUMENTS

| | | | |
|---|---|---|---|
| 7,743,407 B2* | 6/2010 | Sprigg et al. | 726/4 |
| 8,255,280 B1* | 8/2012 | Kay et al. | 705/26.1 |
| 8,255,991 B1 | 8/2012 | Hackborn et al. | |
| 8,327,456 B2 | 12/2012 | Jones et al. | |
| 9,146,720 B1* | 9/2015 | McGilliard et al. | |
| 2002/0133814 A1* | 9/2002 | Bourke-Dunphy et al. | 717/174 |
| 2003/0221190 A1* | 11/2003 | Deshpande et al. | 717/171 |
| 2008/0189793 A1 | 8/2008 | Kirkup et al. | |
| 2009/0172657 A1* | 7/2009 | Makelainen et al. | 717/174 |
| 2011/0202915 A1* | 8/2011 | Kuroyanagi | 717/178 |
| 2012/0144452 A1 | 6/2012 | Dyor et al. | |
| 2012/0317565 A1* | 12/2012 | Carrara et al. | 717/178 |
| 2012/0317638 A1* | 12/2012 | Carrara et al. | 726/17 |
| 2013/0036448 A1* | 2/2013 | Aciicmez et al. | 726/1 |
| 2013/0051615 A1* | 2/2013 | Lim et al. | 382/103 |
| 2013/0139271 A1* | 5/2013 | Arrelid et al. | 726/27 |
| 2013/0212684 A1* | 8/2013 | Li et al. | 726/25 |
| 2013/0339942 A1* | 12/2013 | Brunsman et al. | 717/173 |
| 2013/0347096 A1* | 12/2013 | Lee | 726/17 |
| 2014/0006169 A1* | 1/2014 | Maag | 705/14.69 |
| 2014/0020043 A1* | 1/2014 | Anand et al. | 726/1 |
| 2014/0089379 A1* | 3/2014 | Davis | 709/203 |
| 2015/0074656 A1* | 3/2015 | Eramian | 717/168 |

OTHER PUBLICATIONS

Bartel et al., "Automatically Securing Permission-Based Software by Reducing the Attach Surface: An Application to Android", 2012 ACM, ASE'12, Sep. 3-7, 2012, pp. 274-277; <http://dl.acm.org/citation.cfm?id=2351722&CFID=567484282&CFTOKEN=23837807>.*

(Continued)

*Primary Examiner* — Thuy Dao
*Assistant Examiner* — Ben C Wang
(74) *Attorney, Agent, or Firm* — Morris & Kamlay LLP

(57) ABSTRACT

A data processing device may be operable to determine that a particular application being downloaded onto the data processing device is coupled to one or more other applications. The data processing device may cause display of a set of required usage permissions, where the set of required usage permissions may comprise one or more required usage permissions associated with the particular application itself and one or more required permissions for using the corresponding one or more other applications. The data processing device may cause display of a separate set of required usage permissions associated with each of the one or more other applications, either before the particular application is downloaded or at the same time as the particular application is downloaded.

14 Claims, 5 Drawing Sheets

(56) References Cited

OTHER PUBLICATIONS

Vargas et al, "Security Controls for Android", 2012 IEEE, Nov. 21-23, 2012, pp. 212-216; <http://ieeexplore.ieee.org/stamp/stamp.jsp?tp=&arnumber=6412404>.*

Kapil Singh, "Practical Context-Aware Permission Control for Hybrid Mobile Applications", 2013 Springer-Verlag Berlin Heidelberg, Oct. 23-25, 2013, RAID 2013, LNCS 8145, pp. 307-327; <http://researcher.ibm.com/researcher/files/us-kapil/RAID2013.pdf>.*

ISR of PCT/US2014/018663 dated Jun. 6, 2014.

* cited by examiner

SPLITTING APPLICATION PERMISSIONS ON DEVICES

FIELD

Certain embodiments of the disclosure relate to application permissions on devices. More specifically, certain embodiments of the disclosure relate to a method and system for splitting application permissions on devices.

BACKGROUND

A data processing device, such as, for example, a smart phone, a mobile phone, a tablet and/or other computing device, may comprise one or more applications downloaded onto and running on the data processing device. When an application is downloaded onto the data processing device, for example, from an application distribution server or an application processing device, the application may list what usage permissions or privileges that are required for the application running on the device. In some instances, some of the required permissions may be associated with some components (e.g., other applications) that the application relies on or coupled to and may not be required by the application itself.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

Aspects of the present disclosure are directed to a method and system for splitting application permissions on devices. In various embodiments of the disclosure, a data processing device may comprise one or more applications downloaded onto and running on the data processing device. The data processing device may determine that a particular application being downloaded onto the data processing device is coupled to one or more other applications. The data processing device may cause display of a set of required usage permissions, where the set of required usage permissions may comprise one or more required usage permissions associated with the particular application itself and one or more required permissions for using the corresponding one or more other applications. In this regard, the data processing device may cause display of a separate set of required usage permissions associated with each of the one or more other applications.

Various advantages, aspects and novel features of the present disclosure, as well as details of an illustrated embodiment thereof, will be more fully understood from the following description and drawings.

DETAILED DESCRIPTION

Figure 1:
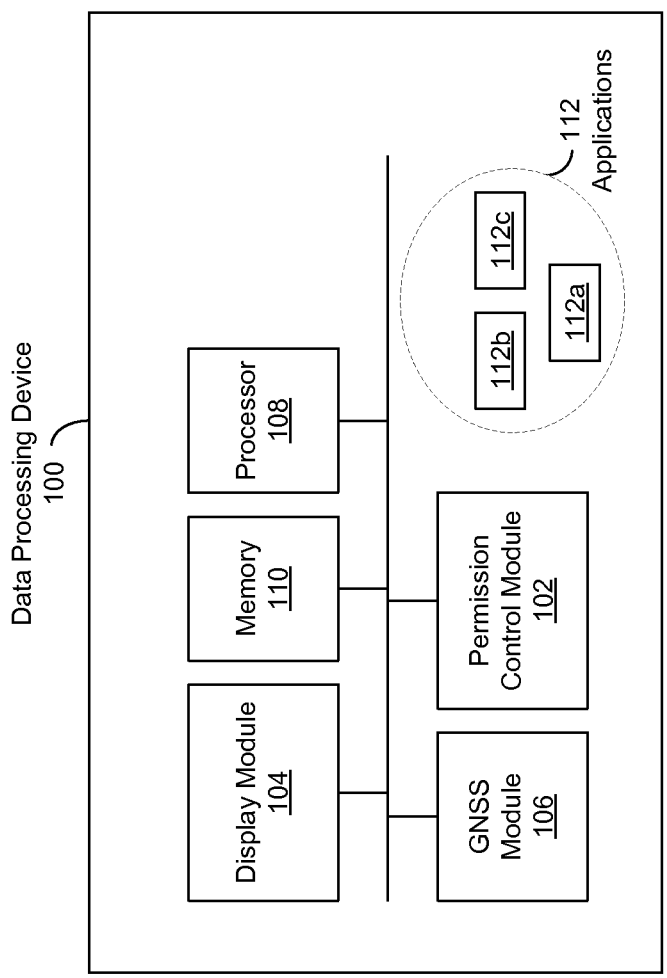
FIG. 1 is a block diagram illustrating an example data processing device, in accordance with an embodiment of the disclosure.

Certain embodiments of the disclosure can be found in a method and system for splitting application permissions on devices. Certain specific details are set forth in the following description and in drawings to provide a thorough understanding of various embodiments of the disclosure. Additional embodiments of the present disclosure may be practiced without several of the details described in the following description.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

In various embodiments of the disclosure, a data processing device may be operable to determine that a particular application being downloaded onto the data processing device may be coupled to one or more other applications. The data processing device may be operable to cause display of a set of required usage permissions, where, the set of required usage permissions may comprise one or more required usage permissions associated with the particular application itself and one or more required permissions for using the corresponding one or more other applications. In this regard, the data processing device may be operable to cause display of a separate set of required usage permissions associated with each of the one or more other applications.

In an example embodiment of the disclosure, in instances when the particular application and a first one or more of the coupled one or more other applications are being downloaded onto the data processing device at the same time, the data processing device may be operable to cause the display of the set of required usage permissions and the display of the separate set of required usage permissions associated with each of the first one or more of the coupled one or more other applications at the same time.

In an example embodiment of the disclosure, a second one or more of the coupled one or more other applications may have been downloaded onto the data processing device or may have been installed as base features in the data processing device, before the particular application is downloaded. In such instances, the data processing device may be operable to cause the display of the separate set of required usage permissions associated with each of the second one or more of the coupled one or more other applications when each of the second one or more of the coupled one or more other applications is first downloaded onto the data processing device or installed as a base feature in the data processing device. In this regard, when the particular application is being downloaded onto the data processing device, the data processing device may operable to cause display of at least the set of required usage permissions without the display of the separate set of required usage permissions associated with each of the second one or more of the coupled one or more other applications.

In an example embodiment of the disclosure, the particular application may comprise, for example, a calculator application and one of the coupled one or more other applications may comprise, for example, an advertisement application programming interface (API). In this regard, the set of required usage permissions for the calculator application may comprise, for example, a required permission for using a display module and a required permission for invoking the advertisement API. The separate set of required usage permissions associated with the advertisement API may comprise, for example, required permissions for using a location service, accessing contact information and/or accessing Internet.

FIG. 1 is a block diagram illustrating an example data processing device, in accordance with an embodiment of the disclosure. Referring to FIG. 1, there is shown a data processing device 100. The data processing device 100 may be, for example, a smart phone, a mobile phone, a tablet and/or other computing device. The data processing device 100 may comprise a processor 108, a memory 110, a display module 104, a permission control module 102 and a global navigation satellite system (GNSS) module 106. The data processing device 100 may comprise a plurality of applications 112 running on the data processing device 100, of which applications 112a-112c are illustrated. Each of the applications 112a-112c may be either downloaded onto the data processing device 100 from, for example, an application distribution server (or an application processing device) or installed as a base feature of the data processing device 100 (e.g., as a base feature of an operating system of the data processing device 100), for example.

The processor 108 may comprise suitable logic, circuitry, interfaces and/or code that may be operable to process data or signals. The processor 108 may be operable to manage and/or control operations of various components or modules in the data processing device 100 such as, for example, the display module 104, the permission control module 102 and/or the GNSS module 106. The processor 108 may utilize an operating system (OS) that enables the execution of various applications such as the applications 112.

The memory 110 may comprise suitable logic, circuitry, interfaces and/or code that may be operable to store information such as executable instructions and/or data that may be utilized by the processor 108 and/or other modules or components in the data processing device 100. The memory 110 may comprise RAM, ROM, low latency nonvolatile memory such as flash memory and/or other suitable electronic data storage.

The display module 104 may comprise suitable logic, circuitry, interfaces and/or code that may be operable to display or present processed content to a user. The display module 104 may be integrated within or operatively coupled to the data processing device 100, for example. The display module 104 may comprise, for example, a presence-sensitive screen such as a touchscreen or touch-sensitive screen.

The permission control module 102 may comprise suitable logic, circuitry, interfaces and/or code that may be operable to perform usage permissions control and/or management for the applications 112 running on the data processing device 100. For example, when a particular application such as the application 112a is being downloaded onto the data processing device 100, the permission control module 102 may be operable to cause display of required usage permissions for the particular application 112a, at the display module 104 for a user of the data processing device 100 to review. In an example embodiment of the disclosure, the particular application 112a being downloaded onto the data processing device 100 may be coupled to another application such as the application 112b. For example, the particular application 112a may comprise the application 112b as a component that it relies on. In such instances, the permission control module 102 may be operable to split the display of the required usage permissions in such a way that a first set of the required usage permissions is associated with the particular application 112a itself and a second set of the required usage permissions is associated with the coupled application 112b, for example. In this regard, the first set of the required usage permissions may comprise a required permission for using the application 112b.

The GNSS module 106 may comprise suitable logic, circuitry, interfaces and/or code that may be operable to provide location services for the data processing device 100. The GNSS module 106 may be operable to detect and receive GNSS signals or data from a plurality of visible GNSS satellites. The received GNSS signals may be utilized by the GNSS module 106 to calculate navigation information such as a position fix and/or velocity of the GNSS module 106, for example. The GNSS module 106 may comprise, for example, a global positioning system (GPS) unit.

In an example embodiment of the disclosure, an application such as the application 112b may require usage of a location service for the application 112b running on the data processing device 100. In such instances, the GNSS module 106 and/or other mechanisms (e.g., by proximity to certain wireless hotspots or cell phone towers) may be utilized to provide the location service for the application 112b.

In operation, one or more of the applications 112a-112c may be downloaded onto and running on the data processing device 100. The permission control module 102 may be operable to determine that a particular application such as the application 112a being downloaded onto the data processing device 100 may be coupled to one or more other applications such as the application 112b. The permission control module 102 may be operable to cause display of a set of required usage permissions, at the display module 104, where, the set of required usage permissions may comprise one or more required usage permissions associated with the particular application 112a itself and one or more required permissions for using the corresponding one or more other applications (e.g., the application 112b). In this regard, the permission control module 102 may be operable to cause display of a separate set of required usage permissions associated with each of the one or more other applications (e.g., the application 112b). The separate set of required usage permissions may be displayed, either before the particular application 112a is downloaded or at the same time as the particular application 112a is downloaded.

Figure 2:
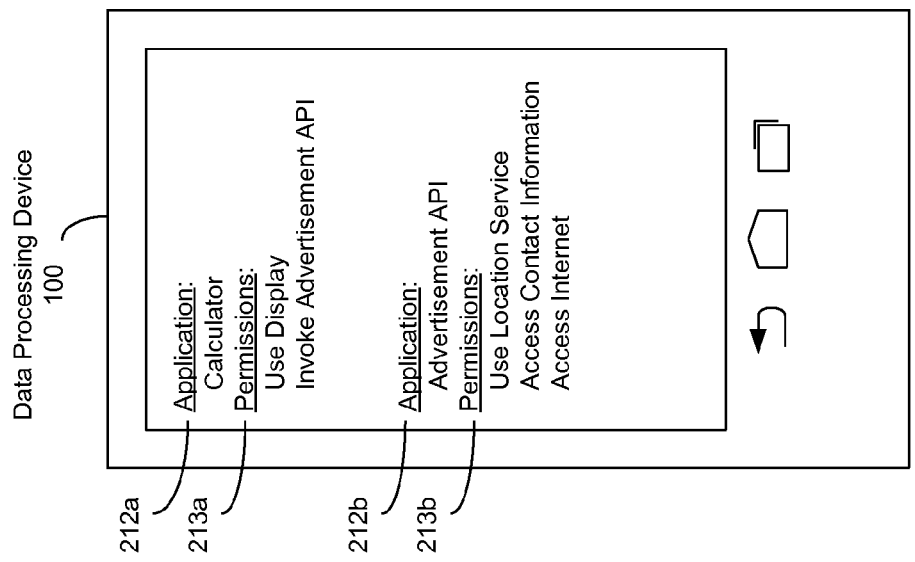
FIG. 2 is a block diagram illustrating an example scenario of splitting application permissions on a data processing device, in accordance with an embodiment of the disclosure.

FIG. 2 is a block diagram illustrating an example scenario of splitting application permissions on a data processing device, in accordance with an embodiment of the disclosure. This scenario is provided by way of example illustration and not of limitation. Referring to FIG. 2, there is shown the data processing device 100. A particular application 212a may be being downloaded onto the data processing device 100. The application 212a may be coupled to another application 212b. The data processing device 100 may be as described with respect to FIG. 1, for example.

In an example operation, the particular application 212a and the application 212b may be being downloaded onto the data processing device 100 at the same time. The permission control module 102 in the data processing device 100 may be operable to determine that the particular application 212a may be coupled to the application 212b (e.g., the application 212b may be a component application that the particular application 212a relies on). The permission control module 102 may be operable to cause display of a set of required usage permissions 213a for the application 212a and display of a separate set of required usage permissions 213b for the coupled application 212b, at the display module 104 in the data processing device 100, at the same time. In this regard, the set of required usage permissions 213a may comprise one or more required usage permissions associated with the particular application 212a itself plus a required permission for using the coupled application 212b.

In this scenario, for example, the particular application 212a may comprise a calculator application and the coupled application 212b may comprise, for example, an advertisement API application (an advertisement may be shown within the calculator application). In such instances, the set of required usage permissions 213a for the calculator application 212a may comprise, for example, a required permission for using the display module 104 and a required permission for invoking the advertisement API 212b. The separate set of usage permissions 213b for the advertisement API 212b may comprise, for example, required permissions for using a location service such as provided by the GNSS module 106 in the data processing device 100, accessing contact information (or list) and/or accessing Internet. In this regard, for example, a user who reviews the usage permissions for the downloaded calculator application 212a may notice that the calculator application 212a itself may not need location information, contact information or Internet access. However, the advertisement API 212b may need these extra permissions such as, for example, the location information (e.g., a GPS location) and the Internet access to be able to fetch the advertisement. For example, the location information may be used for showing geographically relevant advertisements to the user or for excluding showing of certain lawfully prohibited items in certain locations. For example, the contact information may be used for advertisement sharing or recommendation via, for example, a social network.

Figure 3:
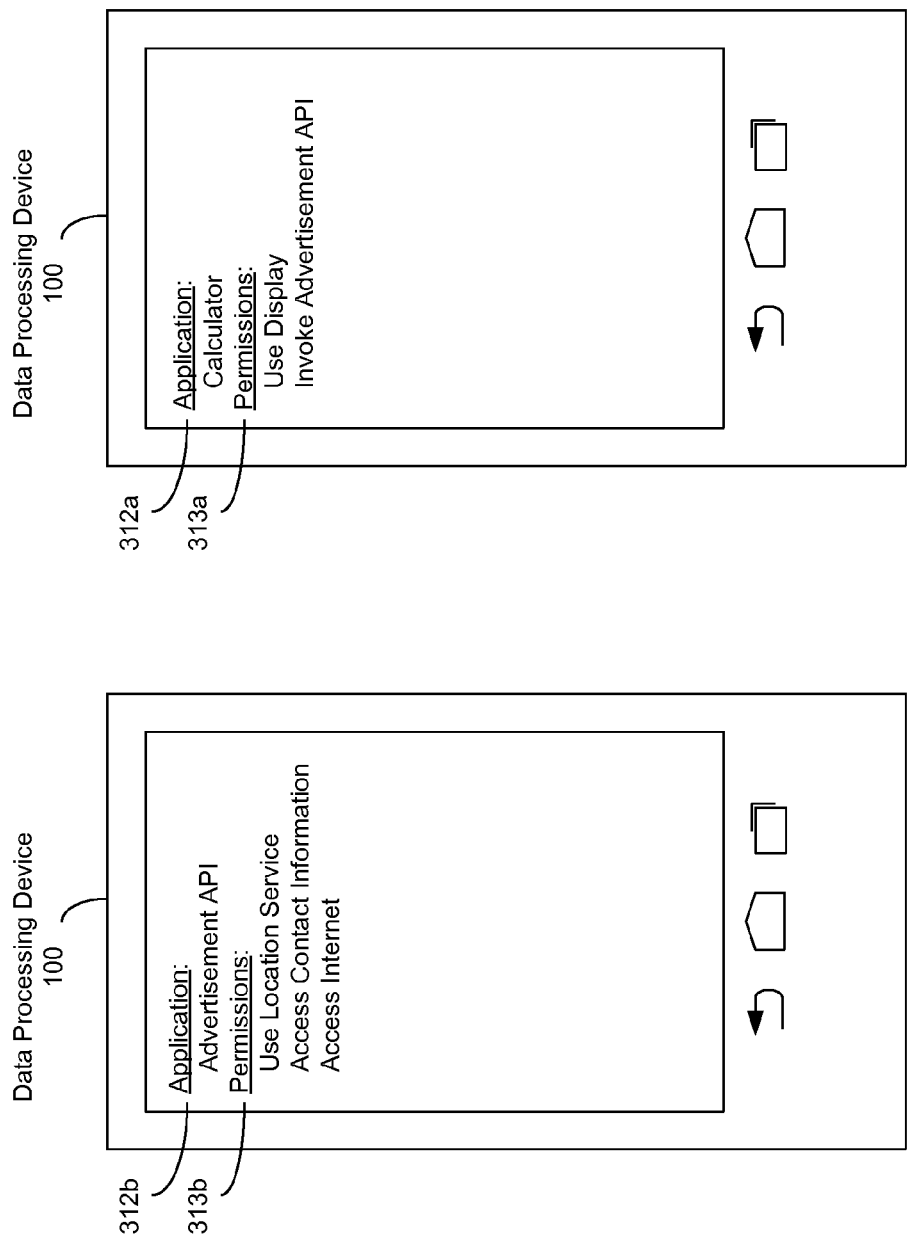
FIG. 3 is a block diagram illustrating an example scenario of splitting application permissions on a data processing device, in accordance with an embodiment of the disclosure.

FIG. 3 is a block diagram illustrating an example scenario of splitting application permissions on a data processing device, in accordance with an embodiment of the disclosure. This scenario is provided by way of example illustration and not of limitation. Referring to FIG. 3, there is shown the data processing device 100. A particular application 312a may be being downloaded onto the data processing device 100. The application 312a may be coupled to another application 312b. The data processing device 100 may be as described with respect to FIG. 1, for example.

In an example operation, the application 312b (e.g., an advertisement API application) may have been downloaded onto the data processing device 100 or may have been installed as a base feature in the data processing device 100, before the particular application 312a (e.g., a calculator application) is downloaded. When the application 312b is first downloaded onto the data processing device 100 or is first installed as a base feature in the data processing device 100, the permission control module 102 in the data processing device 100 may be operable to cause display of a set of required usage permissions 313b (e.g., permissions for using a location service such as provided by the GNSS module 106, accessing contact information and/or accessing Internet) associated with the application 312b, at the display module 104 in the data processing device 100. When the particular application 312a is later being downloaded onto the data processing device 100, the permission control module 102 may be operable to determine that the particular application 312a may be coupled to the application 312b. The permission control module 102 may then be operable to cause display of a set of required usage permissions 313a (e.g., permissions for using the display module 104 and invoking the advertisement API 312b) associated with the particular application 312a, at the display module 104, without the display of the set of required usage permissions 313b associated with the coupled application 312b. In this scenario, a user who reviews the usage permissions for the downloaded particular application 312a (e.g., the calculator application) may notice that the particular application 312a may use another application 312b (e.g., the advertisement API) which may itself already comprise a set of granted usage permissions.

Figure 4:
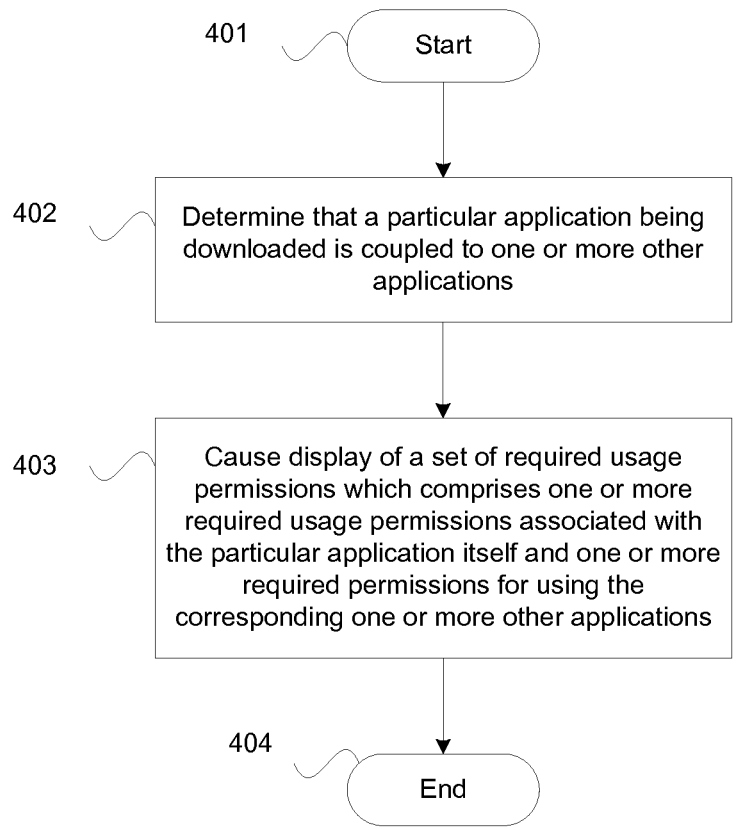
FIG. 4 is a flow chart illustrating example steps for splitting application permissions on devices, in accordance with an embodiment of the disclosure.

FIG. 4 is a flow chart illustrating example steps for splitting application permissions on devices, in accordance with an embodiment of the disclosure. Referring to FIG. 4, the example steps start at step 401. In step 402, the permission control module 102 in the data processing device 100 may be operable to determine that a particular application such as the application 212a (or 312a) being downloaded onto the data processing device 100 may be coupled to one or more other applications such as the application 212b (or 312b). In step 403, the permission control module 102 may be operable to cause display of a set of required usage permissions 213a (or 313a), at the display module 104 in the data processing device 100, where, the set of required usage permissions 213a (or 313a) may comprise one or more required usage permissions associated with the particular application 212a (or 312a) itself and one or more required permissions for using the corresponding one or more other applications (e.g., the application 212b or 312b). The example steps may proceed to the end step 404.

Figure 5:
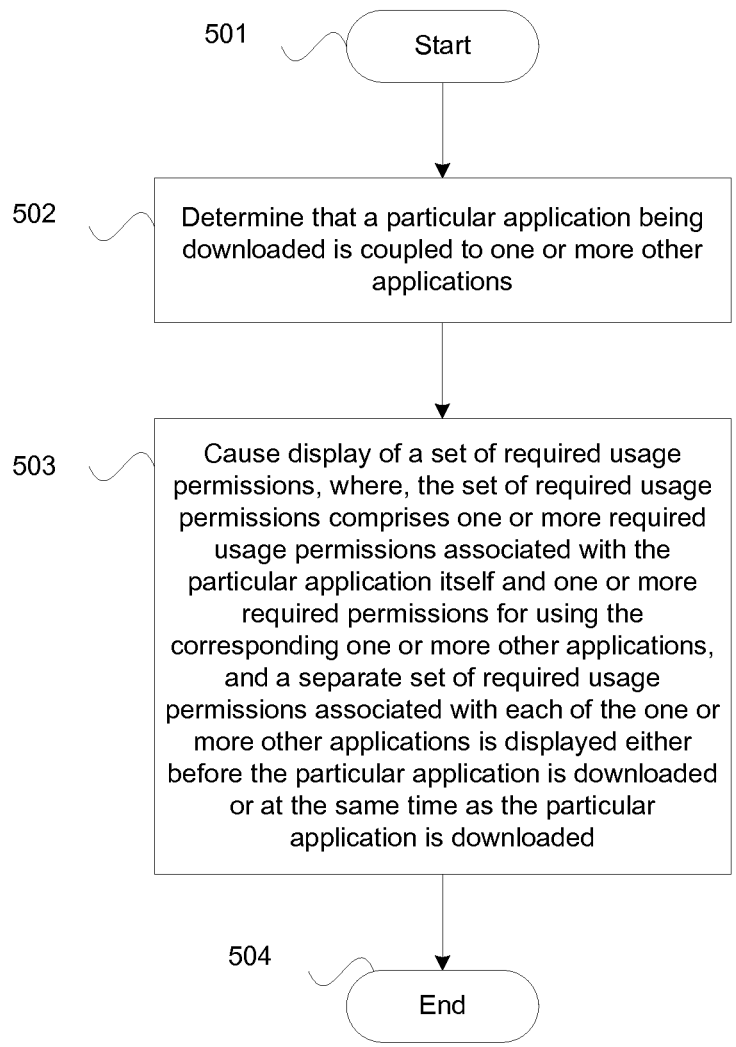
FIG. 5 is a flow chart illustrating example steps for splitting application permissions on devices, in accordance with an embodiment of the disclosure.

FIG. 5 is a flow chart illustrating example steps for splitting application permissions on devices, in accordance with an embodiment of the disclosure. Referring to FIG. 5, the example steps start at step 501. In step 502, the permission control module 102 in the data processing device 100 may be operable to determine that a particular application such as the application 212a (or 312a) being downloaded onto the data processing device 100 may be coupled to one or more other applications such as the application 212b (or 312b). In step 503, the permission control module 102 may be operable to cause display of a set of required usage permissions 213a (or 313a), at the display module 104 in the data processing device 100, where, the set of required usage permissions 213a (or 313a) may comprise one or more required usage permissions associated with the particular application 212a (or 312a) itself and one or more required permissions for using the corresponding one or more other applications (e.g., the application 212b or 312b), and a separate set of required usage permissions 213b (or 313b) associated with each of the one or more other applications (e.g., the application 212b or 312b) may be displayed either before the particular application 312a is downloaded or at the same time as the particular application 212a is downloaded. The example steps may proceed to the end step 504.

In various embodiments of the disclosure, a permission control module 102 in a data processing device 100 may be operable to determine that a particular application 212a (or 312a) being downloaded onto the data processing device 100 may be coupled to one or more other applications such as the application 212b (or 312b). The permission control module 102 may be operable to cause display of a set of required usage permissions 213a (or 313a), at a display module 104 in the data processing device 100, where, the set of required usage permissions 213a (or 313a) may comprise one or more required usage permissions associated with the particular application 212a (or 312a) itself and one or more required permissions for using the corresponding one or more other applications (e.g., the application 212b or 312b). In this regard, the permission control module 102 may be operable to cause display of a separate set of required usage permissions 213b (or 313b) associated with each of the one or more other applications (e.g., the application 212b or 312b), at the display module 104.

In instances when the particular application 212a and a first one or more of the coupled one or more other applications (e.g., the application 212b) are being downloaded onto the data processing device 100 at the same time, the permission control module 102 may be operable to cause the display of the set of required usage permissions 213a and the display of the separate set of required usage permissions 213b associated with each of the first one or more of the coupled one or more other applications (e.g., the application 212b) at the same time.

A second one or more of the coupled one or more other applications (e.g., the application 312b) may have been downloaded onto the data processing device 100 or may have been installed as base features in the data processing device 100, before the particular application 312a is downloaded. In such instances, the permission control module 102 may be operable to cause the display of the separate set of required usage permissions 313b associated with each of the second one or more of the coupled one or more other applications (e.g., the application 312b) when each of the second one or more of the coupled one or more other applications (e.g., the application 312b) is first downloaded onto the data processing device 100 or installed as a base feature in the data processing device 100. In this regard, when the particular application 312a is being downloaded onto the data processing device 100, the permission control module 102 may operable to cause display of at least the set of required usage permissions 313a without the display of the separate set of required usage permissions 313b associated with each of the second one or more of the coupled one or more other applications (e.g., the application 312b).

In an example embodiment of the disclosure, the particular application 212a (or 312a) may comprise, for example, a calculator application and one of the coupled one or more other applications (e.g., the application 212b or 312b) may comprise, for example, an advertisement API. In this regard, the set of required usage permissions 213a (or 313a) for the calculator application 212a (or 312a) may comprise, for example, a required permission for using a display module 104 and a required permission for invoking the advertisement API 212b (or 312b). The separate set of required usage permissions 213b (or 313b) associated with the advertisement API 212b (or 312b) may comprise, for example, required permissions for using a location service (e.g., provided by a GNSS module 106 in the data processing device 100 and/or other mechanisms), accessing contact information and/or accessing Internet.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for splitting application permissions on devices.

Accordingly, aspects of the present disclosure may be realized in hardware, software, or a combination of hardware and software. Aspects of the present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
   in a data processing device:
      determining that a particular application being downloaded onto the data processing device cannot operate without one or more other applications;
      obtaining a first usage permission for the particular application, the first usage permission specifying a first component of the data processing device,
         wherein the particular application cannot operate without the first component;
      obtaining a second usage permission for the one or more other applications, the second usage permission specifying a second component of the data processing device, different from the first component,
         wherein the one or more other applications cannot operate without the second component;
      determining that the second usage permission for the one or more other applications has been granted; and
      in response to the particular application being downloaded onto the data processing device, and in response to determining that the second usage permission has been granted, causing display on the data processing device of a set of required usage permissions, wherein the set of required usage permissions comprises the first usage permission and not the second usage permission.

2. The method according to claim 1, comprising causing display of a separate set of required usage permissions associated with each of the one or more other applications.

3. The method according to claim 2, comprising, if the particular application and a first one or more of the one or more other applications are being downloaded onto the data processing device at the same time, causing the display of the set of required usage permissions and the display of the separate set of required usage permissions associated with each of the first one or more of the one or more other applications at the same time.

4. The method according to claim 2, wherein a second one or more of the one or more other applications have been downloaded onto the data processing device or have been installed as base features in the data processing device, before the particular application is downloaded.

5. The method according to claim 4, comprising causing the display of the separate set of required usage permissions associated with each of the second one or more of the one or more other applications when each of the second one or more of the one or more other applications is first downloaded onto the data processing device or installed as a base feature in the data processing device.

6. The method according to claim 2, wherein the particular application comprises a calculator application and one of the one or more other applications comprises an advertisement application programming interface (API).

7. The method according to claim 6, wherein the set of required usage permissions for the calculator application comprises a required permission for using a display module and a required permission for invoking the advertisement API.

8. The method according to claim 6, wherein the separate set of required usage permissions associated with the advertisement API comprises required permissions for using a location service, accessing contact information and/or accessing Internet.

9. A system, comprising:
a data processing device comprising a processor; and
a non-transitory, computer readable medium in communication with the data processing device and storing instructions that when executed by the processor, the data processing device is operable to:
determine that a particular application being downloaded onto the data processing device cannot operate without one or more other applications;
obtain a first usage permission for the particular application, the first usage permission specifying a first component of the data processing device, the first component comprising the one or more other applications;
wherein the particular application cannot operate without the first component;
obtain a second usage permission for the one or more other applications, the second usage permission specifying a second component of the data processing device, different from the first component;
wherein the one or more other applications cannot operate without the second component;
determine that the second usage permission for the one or more other applications has been granted; and
in response to the particular application being downloaded onto the data processing device, and in response to determining that the second usage permission has been granted, cause display on the data processing device of a set of required usage permissions, wherein the set of required usage permissions comprises the first usage permission and not the second usage permission.

10. The system according to claim 9, wherein the data processing device is operable to cause display of a separate set of required usage permissions associated with each of the one or more other applications.

11. The system according to claim 10, wherein, if the particular application and a first one or more of the one or more other applications are being downloaded onto the data processing device at the same time, the data processing device is operable to cause the display of the set of required usage permissions and the display of the separate set of required usage permissions associated with each of the first one or more of the one or more other applications at the same time.

12. The system according to claim 10, wherein a second one or more of the one or more other applications have been downloaded onto the data processing device or have been installed as base features in the data processing device, before the particular application is downloaded.

13. The system according to claim 12, wherein the data processing device is operable to cause the display of the separate set of required usage permissions associated with each of the second one or more of the one or more other applications when each of the second one or more of the one or more other applications is first downloaded onto the data processing device or installed as a base feature in the data processing device.

14. A method, comprising:
in a data processing device:
determining that a particular application being downloaded onto the data processing device cannot operate without one or more other applications;
obtaining a first usage permission for the particular application, the first usage permission specifying a first component of the data processing device,
wherein the particular application cannot operate without the first component, and
wherein the first component of the data processing device is one selected from the group consisting of: a location service, a contact list, a computer-readable storage, an Internet connection provided to the data processing device, information about a user account on the data processing device, a call state of a cellular component of the data processing device, user-specific data stored by the data processing device, and a messaging service;
obtaining a second usage permission for the one or more other applications, the second usage permission specifying a second component of the data processing device, different from the first component,
wherein the one or more other applications cannot operate without the second component;
determining that the second usage permission for the one or more other applications has been granted; and
in response to the particular application being downloaded onto the data processing device, and in response to determining that the second usage permission has been granted, causing display on the data processing device of a set of required usage permissions, wherein the set of required usage permissions comprises the first usage permission and not the second usage permission.

* * * * *